(12) United States Patent
Fleming et al.

(10) Patent No.: US 10,830,041 B2
(45) Date of Patent: Nov. 10, 2020

(54) LOCALLY LUMPED EQUATION OF STATE FLUID CHARACTERIZATION IN RESERVOIR SIMULATION

(71) Applicant: LANDMARK GRAPHICS CORPORATION, Houston, TX (US)

(72) Inventors: Graham Christopher Fleming, Houston, TX (US); Terry Wayne Wong, Houston, TX (US)

(73) Assignee: LANDMARK GRAPHICS CORPORATION, Houston, TX (US)

(*) Notice: Subject to any disclaimer, the term of this patent is extended or adjusted under 35 U.S.C. 154(b) by 824 days.

(21) Appl. No.: 15/501,139

(22) PCT Filed: Sep. 3, 2014

(86) PCT No.: PCT/US2014/053855
§ 371 (c)(1),
(2) Date: Feb. 1, 2017

(87) PCT Pub. No.: WO2016/036359
PCT Pub. Date: Mar. 10, 2016

(65) Prior Publication Data
US 2017/0218755 A1  Aug. 3, 2017

(51) Int. Cl.
*E21B 49/08* (2006.01)
*G01V 99/00* (2009.01)
(Continued)

(52) U.S. Cl.
CPC ........... *E21B 49/087* (2013.01); *E21B 43/00* (2013.01); *E21B 43/16* (2013.01); *E21B 43/168* (2013.01);
(Continued)

(58) Field of Classification Search
CPC .. G01V 99/005; G01V 11/005; E21B 49/087; E21B 47/003; E21B 47/07; E21B 47/00;
(Continued)

(56) References Cited

U.S. PATENT DOCUMENTS

| 2005/0065759 A1* | 3/2005 | Barroux | E21B 17/206 |
| | | | 703/10 |
| 2007/0112547 A1 | 5/2007 | Ghorayeb et al. | |

(Continued)

FOREIGN PATENT DOCUMENTS

| WO | WO-0037898 A1 | 6/2000 |
| WO | WO-2007106244 A2 | 9/2007 |
| WO | WO-2013188087 A1 | 12/2013 |

OTHER PUBLICATIONS

Shiralkar et al., "Development and field application of a high performance, unstructured simulator with parallel capability", 2005, Society of Petroleum Engineers (SPE) Reservoir Simulation Symposium, pp. 1-10.*

(Continued)

*Primary Examiner* — Juan C Ochoa

(57) ABSTRACT

In some embodiments, a method for locally lumped equation of state fluid characterization can include determining a set of components for the material balance calculations for a plurality of grid blocks of a reservoir. The plurality of grid blocks can experience different recovery methods between them. Lumping schemes can be determined for the plurality of grid blocks. Phase behavior calculations can be performed on the plurality of grid blocks, wherein different lumping schemes can be used across the plurality of grid blocks.

6 Claims, 3 Drawing Sheets

(51) Int. Cl.

| | |
|---|---|
| *G01V 11/00* | (2006.01) |
| *E21B 47/00* | (2012.01) |
| *E21B 43/00* | (2006.01) |
| *E21B 47/003* | (2012.01) |
| *E21B 47/07* | (2012.01) |
| *E21B 43/16* | (2006.01) |
| *E21B 43/20* | (2006.01) |
| *E21B 47/06* | (2012.01) |

(52) U.S. Cl.
CPC .............. *E21B 43/20* (2013.01); *E21B 47/00* (2013.01); *E21B 47/003* (2020.05); *E21B 47/06* (2013.01); *E21B 47/07* (2020.05); *E21B 49/081* (2013.01); *G01V 99/005* (2013.01); *G01V 11/005* (2013.01)

(58) Field of Classification Search
CPC ........ E21B 43/00; E21B 43/16; E21B 43/168; E21B 43/20; E21B 47/06; E21B 49/081
USPC ....................................................... 703/10, 2
See application file for complete search history.

(56) References Cited

U.S. PATENT DOCUMENTS

| | | | |
|---|---|---|---|
| 2011/0040536 A1 | 2/2011 | Levitan | |
| 2013/0197808 A1* | 8/2013 | Zuo .......................... | E21B 47/00 702/6 |
| 2015/0006084 A1* | 1/2015 | Zuo .......................... | E21B 49/02 702/13 |
| 2015/0127314 A1 | 5/2015 | Fleming et al. | |
| 2015/0211357 A1* | 7/2015 | Chen ....................... | E21B 47/06 73/152.27 |

OTHER PUBLICATIONS

European Patent Office, Supplementary Partial European Search Report and Opinion, Jun. 7, 2018, 11 pages, Europe.

Oivind Fevang, Kameshwar Singh, and Curtis H. Whitson, Guidelines for Choosing Compositional and Black-Oil Models for Volatile Oil and Gas-Condensate Reservoirs, Oct. 1-4, 2000, 16 pages, SPE 63087, Society of Petroleum Engineers, Inc., 2000 SPE Annual Technical Conference and Exhibition, Dallas, Texas.

L. Zhang, R. Pieterson, B. Dindoruk, P. Stoffels and Y. Fan, a New and Practical Oil Characterization Method for Thermal Projects: Application to Belridge Diatomite Steam Flood, Apr. 19-25, 2013, 15 pages, SPE 165333, Society of Petroleum Engineers, Inc., SPE Western Regional & AAPG Pacific Section Meeting, 2013 Joint Technical Conference, Monterey, California.

Korean Intellectual Property Office, International Search Report and Written Opinion, dated May 22, 2015, 15 pages, Korea.

Claude F. Leibovici, John W. Barker and David Waché, A Method for Delumping the Results of a Compositional Reservoir Simulation, Sep. 27-30, 1998, 11 pages, SPE 49068, Society of Petroleum Engineers, Inc., 1998 SPE Annual Technical Conference and Exhibition, New Orleans, Louisiana.

Reza Rastegar and Kristian Jessen, Lumping and Delumping for Integrated Compositional Modeling, Oct. 4-7, 2009, 12 pages, SPE 125017, Society of Petroleum Engineers, 2009 SPE Annual Technical Conference and Exhibition, New Orleans, Louisiana.

E.Vignati, A.Cominelli, R.Rossi and P.Roscini, Innovative Implementation of Compositional Delumping in Integrated Asset Modeling, Jun. 9-12, 2008, SPE 113769, Society of Petroleum Engineers, EUROPEC/EAGE Conference and Exhibition, Rome.

* cited by examiner

LOCALLY LUMPED EQUATION OF STATE FLUID CHARACTERIZATION IN RESERVOIR SIMULATION

CROSS-REFERENCE TO RELATED APPLICATIONS

This application is a U.S. national stage patent application of International Patent Application No. PCT/US2014/053855, filed on Sep. 3, 2014, the benefit of which is claimed and the disclosure of which is incorporated herein by reference in its entirety.

BACKGROUND

Equation of State (EOS) fluid characterization can be used to model the behavior of hydrocarbon reservoir fluids when variation in the fluid composition has a significant influence on the recovery of the hydrocarbons. The EOS fluid characterizations can be used as the parameters of PVT equations that relate the pressure, volume and temperature (PVT) of a system. These equations of state can be used to predict equilibrium conditions such as the number of phases that are present in the fluid (e.g., single phase or multiple phases). The equations can also be used to describe the properties of the phases, such as the density of the phase, and the composition of each phase.

Hydrocarbon fluids may contain thousands of components. It is impractical to determine the properties of all of these components and to use this number of components in simulation calculations, so EOS characterizations reduce the number of components by grouping together all the components in a range of molecular weights. Each group of components is referred to as a pseudo-component. The properties of these pseudo-components are adjusted so that the fluid properties give acceptable agreement with laboratory data over the range of pressures, temperatures and fluid composition likely to be encountered in the reservoir and the production/injection facilities. For example, for each pseudo-component of a fluid, the molecular weight, the critical temperature, and the critical pressure may all need to be adjusted. Additionally, properties that are used to relate any two pseudo-components (e.g., binary interaction coefficients) may also be adjusted. The cost of calculating fluid properties using an EOS characterization increases greatly as the number of lumped components increases, so it is advantageous to use the fewest number of lumped components that can give an acceptable match to the laboratory data.

DETAILED DESCRIPTION

During production operations, simulations can be used to model the properties of fluid reservoirs that may be subjected to different recovery mechanisms (e.g. gravity drainage, fluid expansion, displacement by water, gas) A reservoir can be subjected to multiple different recovery mechanisms in different geographical locations (e.g. water displacement near an aquifer, gas expansion in a gas cap), and/or for different periods of time. (e.g., because of the commencement or termination of gas, water, steam, solvent injection). Each recovery mechanism has a different sensitivity to the composition of the reservoir and injected fluids, and the simulations should take this into account.

The embodiments herein encompass a method that locally lumps a plurality of components, of the thousands of components that can typically make up a hydrocarbon fluid, to be represented by usually a smaller number of pseudo-components (i.e., EOS characterization). Components are lumped together to be represented by a pseudo-component having similar properties as the components being replaced. Unlike the typical methods of EOS characterization, the embodiments herein provide locally lumped EOS characterization such that the characterization can vary from point-to-point across the reservoir as the recovery mechanisms vary across the reservoir.

Figure 1:
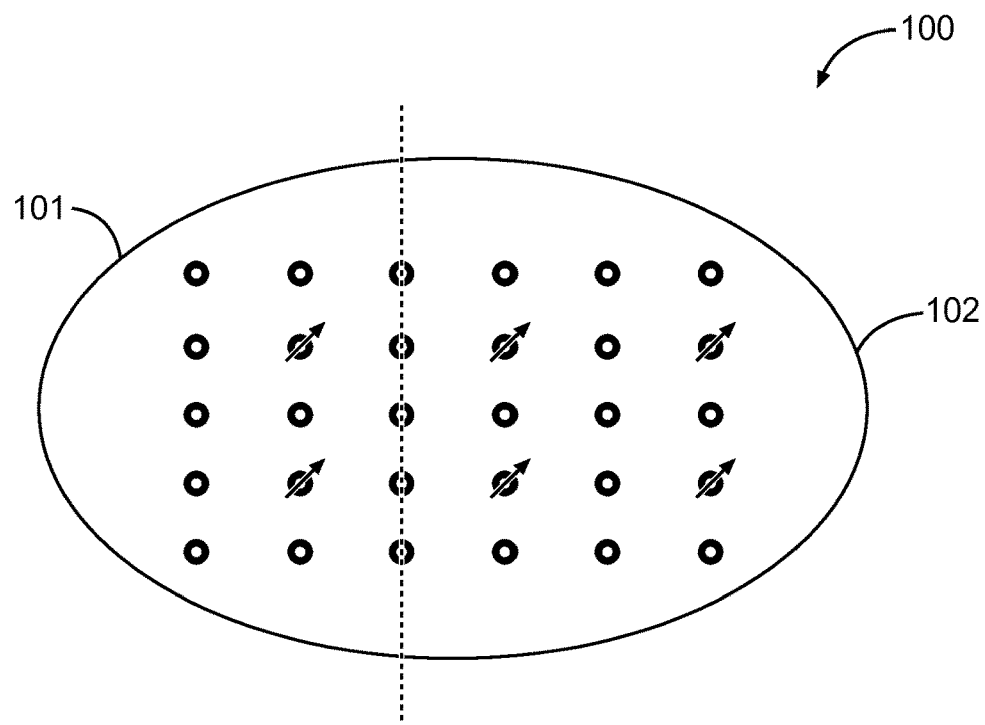
FIG. 1 illustrates a reservoir with a different recovery method used in each of two regions.

FIG. 1 illustrates a reservoir with a different recovery method used in each of two regions, and a corresponding different recovery mechanism in each of these regions. This reservoir is for purposes of illustration only as the present embodiments are not limited to any certain quantity of regions nor to any certain recovery mechanism. In other words, the locally lumped EOS characterization method can adapt to any number and type of recovery mechanisms across a reservoir, generating a different group of pseudo-components for each different recovery mechanism region.

FIG. 1 shows a gas injection region 101 and a water injection region 102 within the same reservoir 100. In other words, in order to recover the hydrocarbon fluid in the reservoir, the water injection region uses a water injection recovery mechanism and the gas injection region uses a gas injection recovery mechanism.

Since the water injection recovery mechanism introduces fewer new components than the gas injection recovery mechanism, the water injection recovery mechanism can achieve an acceptable accuracy for phase behavior calculations with a fewer number of pseudo-components ($NC_1$ components) than the gas injection recovery mechanism pseudo-components ($NC_2$ components). For component mass balance calculations, the components used in the gas injection recovery mechanism can be used throughout the reservoir 100. However, in the water injection region 102, these components are first lumped into the $NC_1$ components for the water injection region 102 and the phase behavior calculations can then be performed using the EOS characterization for the water injection recovery mechanism. The resulting phase compositions can then be de-lumped and the derivatives of the fluid properties (e.g., phase densities, saturations, phase compositions) with respect to the $NC_1$ components can also be de-lumped in order to be expressed with respect to the original $NC_2$ components.

The phase behavior calculations with the lumped components can take less processing time than the delumped EOS calculations. This can reduce the processing time used for the reservoir simulation. This may be particularly true if the simulation is run using an Implicit Pressure Explicit Saturation (IMPES) formulation, where the component masses are solved explicitly, rather than an implicit formulation, where the component masses are solved implicitly. The implicit formulation results in a much larger system of equations and uses a relatively large amount of processing time to solve the linear system of equations, so the phase behavior calculations can use a smaller proportion of the total processing time.

The locally lumped EOS characterization method can be used with any lumping scheme. However, the lumped components of FIG. 2 can more closely reproduce the solution that would be obtained if the mass balance was performed using the lumped components. The lumped components can be chosen so that each of the delumped components makes up a part (or the whole) of only one of the lumped components.

Figure 2:
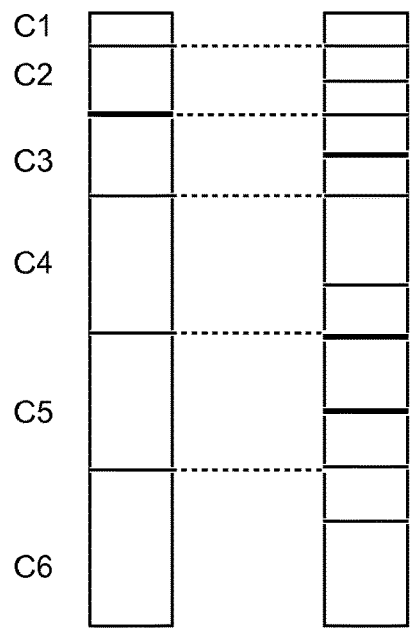
FIG. 2 illustrates a table of one embodiment of component lumping.

FIG. 2 illustrates a table of one embodiment of component lumping. The number of lumped components and/or their associated delumped components are for purposes of illustration only. The quantity of delumped components represented by each lumped component can vary with each embodiment. Additionally, the particular delumped components to be lumped with a particular lumped component can also vary with each embodiment.

In this figure, the lumped fluid characterization for the water injection recovery mechanism uses six pseudo-components represented by C1 through C6. The lumped fluid characterization used for the gas injection recovery mechanism uses eleven pseudo-components represented as G1 through G11. For the water injection recovery mechanism, pseudo-component C1 is the same as G1 for the gas injection recovery mechanism, C2 is the sum of G2 and G3, C3 is the sum of G4 and G5, C4 is the sum of G6 and G7, C5 is the sum of G8 and G9, and C6 is the sum of G10 and G11. The illustrated choice of lumping has the property that the mass balance, using the mass of the components of the second characterization as the primary variables, can give the same result as if the components of the first characterization had been used as the primary variables.

If the recovery mechanism changes during the simulation, the choice of lumping can be changed to be appropriate for the new recovery mechanism. For example, if part of the reservoir 100 is switched from water injection to gas injection, the EOS calculations could be performed with a different set of lumped components and corresponding characterization.

The choice of lumping could also be dynamically chosen based on changes in composition in a grid block. These changes might be a different recovery method being used or elements from a recovery method for one portion of the reservoir invading another portion of the reservoir. For example, if the injected gas of FIG. 1 invades the water injection region 102, the components in the water injection region 102 will change. Thus, the choice of lumped components could be switched dynamically to take into account the additional components in the water injection region 102.

However, a change in the lumping and EOS characterization will result in slightly different phase densities and saturations, thus introducing a volume balance error (i.e., the fluid volume no longer exactly equals the pore volume in the grid block). This volume balance error will result in a spurious pressure change in the grid block on the next iteration of the solution. To avoid this, a onetime adjustment can be made to the pore volume when the characterization is switched.

Figure 3:
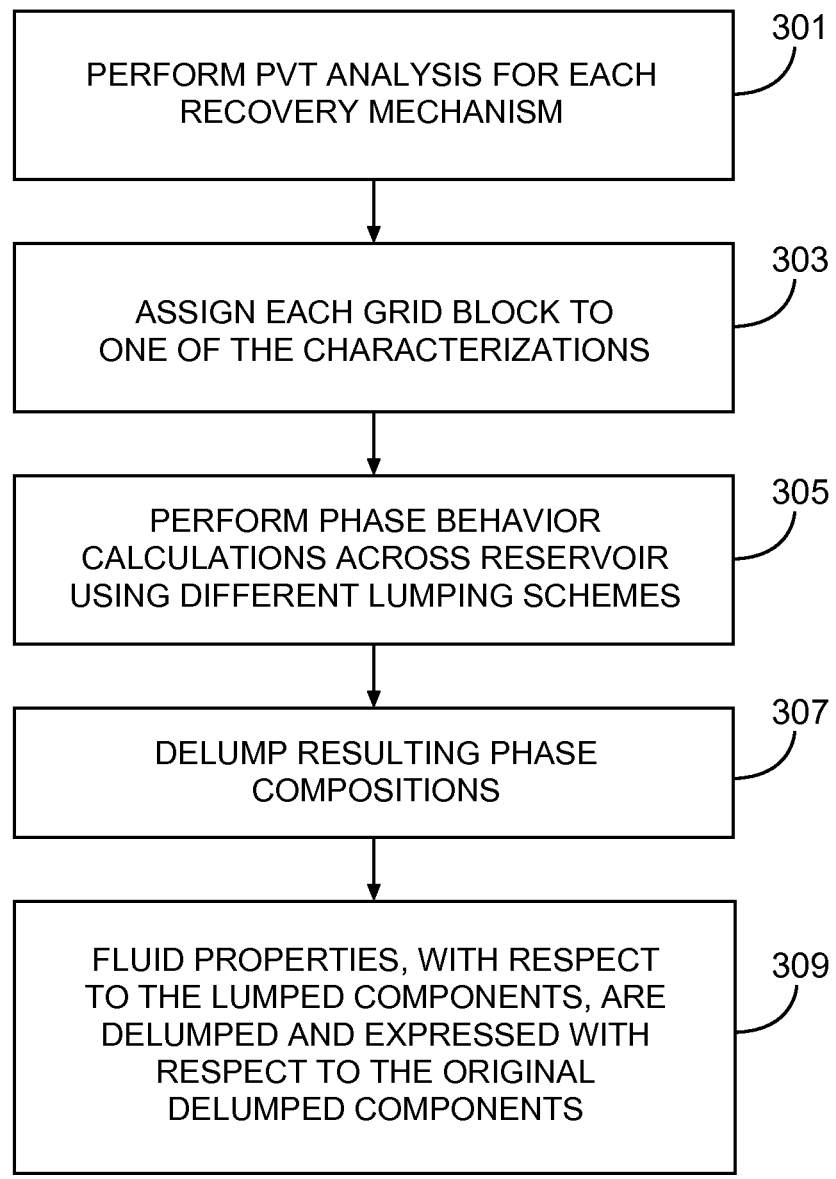
FIG. 3 illustrates a flowchart of an embodiment of a method for EOS fluid characterization using component lumping.

FIG. 3 illustrates a flowchart of an embodiment for locally lumped EOS fluid characterization in reservoir simulations. Prior to the simulation, PVT analysis is performed to develop EOS characterizations for each recovery mechanism 301 that will be encountered in the reservoir. Each characterization can have a different number of pseudo-components, and different properties for any pseudo-components that are in common. The number of components for each characterization should be the fewest that are capable of accurately representing the phase behavior for each recovery mechanism. The material balance components used for the material balance calculations are determined by the characterization with the largest number of components. The reservoir is divided up into grid blocks, and for each grid block the mass of the material balance components is conserved. The material balance components for the plurality of grid blocks of the reservoir is determined wherein different recovery mechanism are experienced for local groupings of grid blocks.

Each grid block is assigned one of the EOS characterizations 303 (e.g., lumping scheme), depending on the recovery mechanism that is present at the location of the grid block. If the characterization assigned to a grid block is not the characterization associated with the material balance components, then the PVT properties of the fluid in the grid block (e.g. phase compositions, phase volume, phase density and phase viscosity) are calculated by first lumping the components into the components associated with the characterization, calculating the properties using the lumped components, then delumping the phase compositions and the derivatives of phase volumes, densities and viscosities to get these quantities in terms of the material balance components. The process can be referred to as locally lumped EOS fluid characterizations.

In an embodiment, the components from a first recovery mechanism having a greater number of components can be lumped into the components for a second recovery mechanism having the least number of components (different from the first recovery mechanism). The reduced number of components can be referred to as the pseudo-components representing the greater number of components since they can represent the greater number of components in phase behavior calculations, thus, reducing the processor time used for the reservoir simulation. As seen in FIG. 2 and discussed previously, each pseudo-component can represent one or more of the material balance components.

Based on the recovery mechanism and/or fluid properties in a particular grid block or group of grid blocks, phase behavior calculations can be performed across the reservoir on a grid block or group of grid blocks using different lumping schemes based on a composition and/or recovery method for the grid block or group of grid blocks 305. The resulting phase compositions are delumped 307 and the fluid properties (e.g., phase densities and saturations, phase compositions) with respect to the lumped components are delumped and expressed with respect to the original delumped components 309. Using this locally lumped EOS fluid characterization method, different lumping schemes can be applied to different grid blocks and/or at different times (e.g., when the recovery mechanism of a grid block changes).

Data obtained during a wireline sampling operation can be used in the compositional reservoir simulations. For example, after a recovery operation has started on a reservoir, a wireline sampling operation can be used to obtain a fluid sample that can be used to determine the fluid properties at a particular location of the reservoir due to components being added to the reservoir by a particular recovery mechanism. If necessary, the data for the reservoir simulation model can be adjusted to improve the match between the measured fluid properties measured on the sample, and the fluid properties predicted by using the original characterization at the corresponding grid block in the reservoir simulation. Adjustments of this kind improve the accuracy of the reservoir simulation, and make it more reliable for predicting hydrocarbon recovery in response to changes in how the reservoir is operated.

Figure 4:
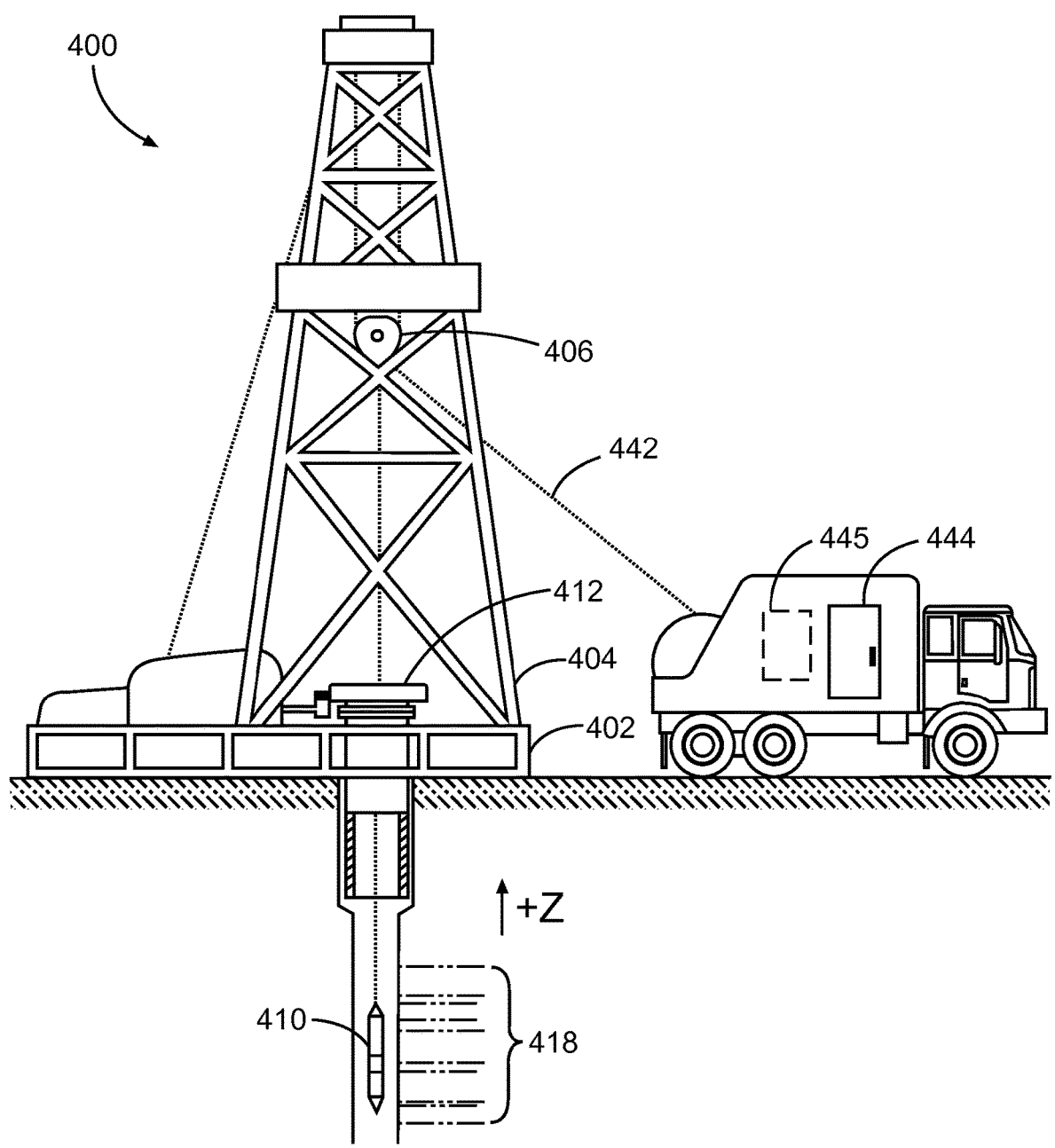
FIG. 4 illustrates a diagram of an embodiment of a wireline logging operation in accordance with various embodiments.

FIG. 4 illustrates generally an example of a wireline sampling system. A hoist 406 may be included as a portion of a platform 402, such as coupled to a derrick 404, and used to raise or lower equipment such as a wireline sonde 410 into or out of a borehole. In this wireline example, a cable 442 may provide a communicative coupling between a logging facility 444 (e.g., including a processor circuit 445 including memory or other storage or control circuitry) and the sonde 410. In this manner, information about the reservoir 418 may be obtained. The processor circuit 445 may be configured to execute any methods for characterizing fluids, locally lumping a plurality of components, and/or reservoir simulations.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method for locally lumped equation of state fluid characterization, the method comprising:
   determining material balance components for each of a plurality of grid blocks of a model of a reservoir, the plurality of grid blocks corresponding to a plurality of geographic locations of the reservoir, wherein a different one of a plurality of recovery mechanisms is used for each geographic location;
   assigning an equation of state (EOS) characterization to each of the plurality of grid blocks in the model of the reservoir, based on the recovery mechanism used for the geographic location corresponding to that grid block;
   generating a pseudo-component group for each of the plurality of grid blocks, using a lumping scheme corresponding to the EOS characterization assigned to that grid block, wherein different lumping schemes are used across the plurality of grid blocks, each pseudo-component in the pseudo-component group represents one or more delumped components, and each pseudo-component group comprises fewer components than a represented grid block; and
   performing a reservoir simulation based on the pseudo-component group generated for each of the plurality of grid blocks across the model of the reservoir.

2. The method of claim 1, further comprising performing a wireline sampling operation in the reservoir in obtaining fluid samples from which fluid characterizations may be derived.

3. The method of claim 2, further comprising using results of the reservoir simulation during recovery operations.

4. The method of claim 1, wherein performing the reservoir simulation based on the plurality of pseudo-component groups comprises choosing a pseudo-component group for a particular grid block or group of grid blocks based on a reduced quantity of components that are configured to represent a phase behavior calculation.

5. The method of claim 4, wherein the reduced quantity of components are less than a quantity of delumped components for the particular grid block of group of grid blocks.

6. The method of claim 1, further comprising:
   performing phase behavior calculations for a group of grid blocks of the model of the reservoir;
   dynamically changing the EOS characterization and the pseudo-component group for a grid block in the group of grid blocks, based on the phase behavior calculations when a recovery mechanism for a geographic location corresponding to the grid block changes.

* * * * *